(12) United States Patent
Roberts

(10) Patent No.: US 11,080,157 B1
(45) Date of Patent: Aug. 3, 2021

(54) AUTOMATED RESILIENCY ANALYSIS IN DISTRIBUTED SYSTEMS

(71) Applicant: Amazon Technologies, Inc., Seattle, WA (US)

(72) Inventor: Charlie Roberts, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 181 days.

(21) Appl. No.: 16/362,258

(22) Filed: Mar. 22, 2019

(51) Int. Cl.
    *G06F 11/00*     (2006.01)
    *G06F 11/263*     (2006.01)
    *H04L 12/24*     (2006.01)
    *H04L 29/08*     (2006.01)

(52) U.S. Cl.
    CPC ............ *G06F 11/263* (2013.01); *H04L 41/14* (2013.01); *H04L 67/10* (2013.01)

(58) Field of Classification Search
    CPC ...................................................... G06F 11/263
    See application file for complete search history.

(56) References Cited

U.S. PATENT DOCUMENTS

| | | | |
|---|---|---|---|
| 9,483,383 B2 | 11/2016 | Baset et al. | |
| 9,612,935 B2 | 4/2017 | Sinha et al. | |
| 9,753,826 B2 | 9/2017 | Deng et al. | |
| 9,842,045 B2 | 12/2017 | Heorhiadi et al. | |
| 2010/0287535 A1* | 11/2010 | Kim | G06F 11/3688 717/127 |
| 2013/0246853 A1* | 9/2013 | Salame | G06F 11/0709 714/37 |
| 2015/0161025 A1* | 6/2015 | Baset | G06F 11/3612 714/38.1 |
| 2015/0369865 A1* | 12/2015 | Hershman | H03K 19/003 326/8 |
| 2016/0371134 A1* | 12/2016 | Raghavendra | G06F 11/3676 |
| 2017/0024299 A1* | 1/2017 | Deng | G06F 11/263 |
| 2018/0039567 A1* | 2/2018 | Rajagopalan | G06F 11/3672 |

(Continued)

OTHER PUBLICATIONS

Yan Cui, "Applying principles of chaos engineering to AWS Lambda with latency injection", Retrieved from https://theburningmonk.com/2017/11/applying-principles-of-chaos-engineering-to-aws-lambda-with-latency-injection/, Nov. 2017, pp. 1-26.

(Continued)

*Primary Examiner* — Jonathan D Gibson
(74) *Attorney, Agent, or Firm* — Robert C. Kowert; Kowert, Hood, Munyon, Rankin & Goetzel, P.C.

(57) ABSTRACT

Methods, systems, and computer-readable media for automated resiliency analysis in distributed systems are disclosed. A resiliency analyzer determines a plurality of computing resources associated with a system architecture. The resiliency analyzer determines one or more similar system architectures with respect to the system architecture. The resiliency analyzer determines one or more anticipated behaviors associated with the system architecture based at least in part on the plurality of computing resources and the one or more similar system architectures. The resiliency analyzer generates one or more resiliency tests associated with the one or more anticipated behaviors. The one or more resiliency tests are performed on the system architecture to determine one or more effects of the behaviors on a resiliency of the system architecture.

20 Claims, 8 Drawing Sheets

(56) References Cited

U.S. PATENT DOCUMENTS

2018/0039570 A1\* 2/2018 Rajagopalan ....... G06F 11/3688

OTHER PUBLICATIONS

Yan Cui, "How can we apply the principles of chaos engineering to AWS Lambda?", Retrieved from https://theburningmonk.com/2017/11/applying-principles-of-chaos-engineering-to-aws-lambda-with-latency-injection/, Oct. 2017, pp. 1-9.
Ben Kehoe, "Monkeyless Chaos: Integration Testing for Serverless Architectures," Retrieved from https://serverless.zone/monkeyless-chaos-integration-testing-for-serverless-architectures-9d1a4208c3ca; pp. 1-5.

\* cited by examiner

AUTOMATED RESILIENCY ANALYSIS IN DISTRIBUTED SYSTEMS

BACKGROUND

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems has increased, the tasks of provisioning, administering, and managing the computing resources have become increasingly complicated.

Such a distributed system may encompass numerous subsystems that work in concert. For example, a distributed system operated by an online store may include an ordering system that processes customer orders of goods and/or services. When an order is placed or modified, numerous services, processes, or subsystems may be invoked to perform various operations related to the order. For example, the payment type may be verified, the delivery address may be verified, the inventory may be updated, and so on. Such operations may be implemented using multiple services or other computing resources. Small failures in individual services or subsystems can cascade into more significant outages that affect an entire system.

Figure 1:
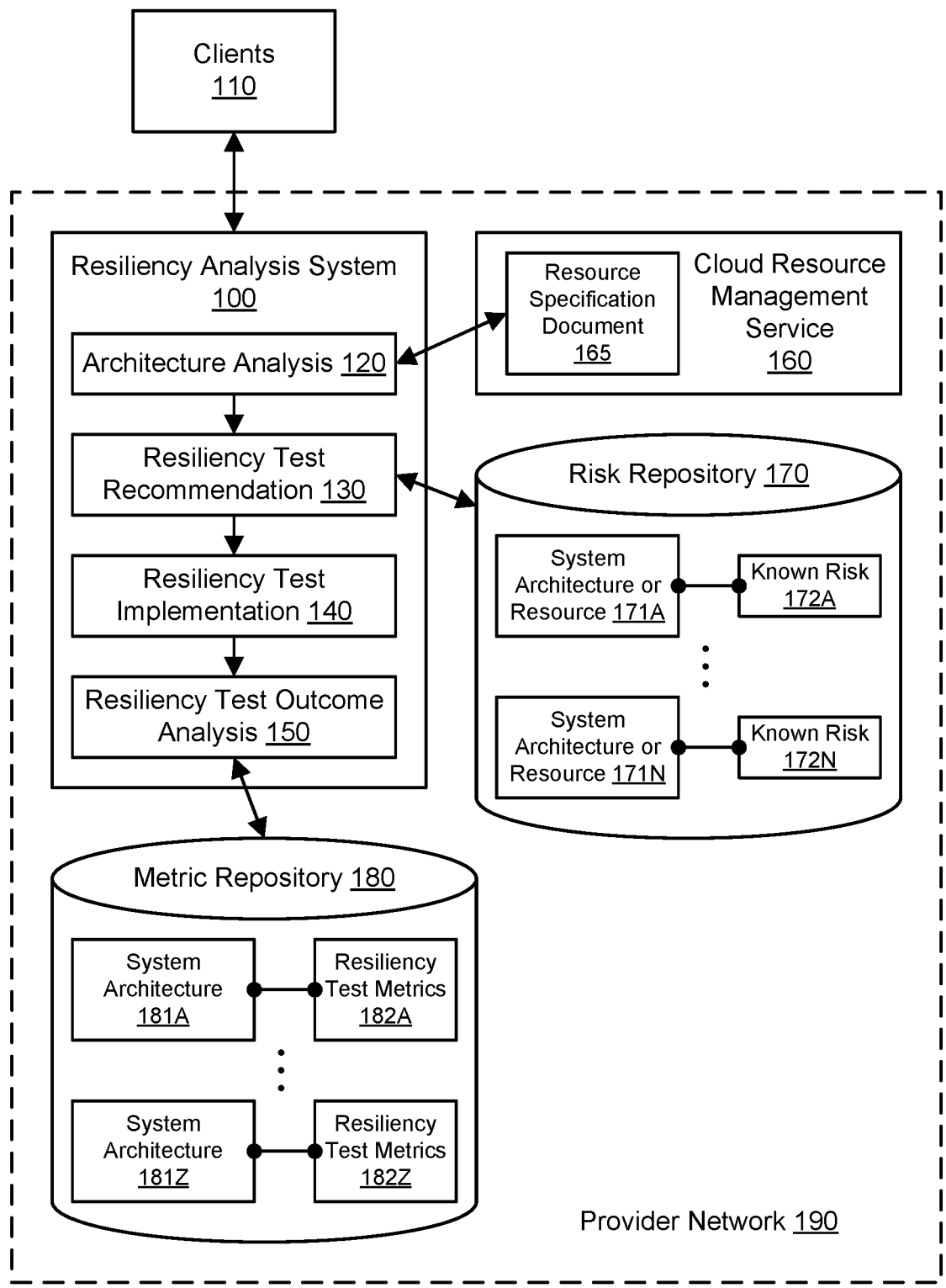
FIG. 1 illustrates an example system environment for automated resiliency analysis in distributed systems, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automated resiliency analysis in distributed systems are described. System architectures may include numerous computing resources that collaborate to perform complex tasks. For example, a particular system architecture may include multiple services, networking components, virtual computing instances, functions to be executed by a serverless compute service, and/or other suitable components. The computing resources may be hosted in the cloud by a multi-tenant provider network. The computing resources may be distributed across one or more service layers and/or one or more client accounts with the provider network. In some cases, small failures in individual services or subsystems (including outages as well as degraded performance) can cascade into more significant outages that affect the entire system represented by the system architecture. To prevent such outages and performance degradation, a resiliency analyzer described herein may identify potential failures in a system architecture via a repository of known failure scenarios, recommend resiliency tests for behaviors associated with the potential failures, and run the tests (or provide the tests for clients to run) to determine the impact of the tested behaviors on the resiliency of the system. Developers may alter resource configurations or system architectures to mitigate any unwanted behaviors identified by the resiliency analyzer.

Using prior approaches to fault injection, one parameter value in a system was typically changed at any given time. However, such limited modeling may fail to capture the complexity of real-world outages. The resiliency analyzer described herein may generate resiliency tests that model complex, real-world failure scenarios. For example, if a downstream component (e.g., a data store) experiences degraded performance (e.g., a "brownout" with lower availability and/or higher latency), then an upstream component that relies on the downstream component may similarly have its performance degraded as its requests are delayed or discarded. However, the upstream component may also increase its retry rate due to the delayed or discarded requests, and the additional request volume may further degrade the performance of the downstream component, leading in turn to further degraded performance at the upstream component. The resiliency analyzer may model such failure scenarios by injecting multiple state changes that affect availability, latency, error rates, and so on, potentially in multiple components of a system architecture under analysis. Using these techniques, developers may more accurately determine the resiliency of their system architectures against behaviors associated with known failure scenarios.

As one skilled in the art will appreciate in light of this disclosure, embodiments may be capable of achieving certain improvements to computer technology, including some or all of the following technical effects: (1) improving the availability and performance of a computer-implemented system by accurately determining the resiliency of the system against known failure scenarios, such that developers can reduce flaws in the system before the system enters production; (2) improving the accuracy of resiliency testing by using resiliency tests that model complex, real-world failures using multiple state changes; (3) improving the accuracy of resiliency testing by using automated analysis of system architectures with a repository of known failure scenarios, thereby reducing human error; (4) improving the speed of software development by performing accurate resiliency testing at an early development stage and generating automated recommendations of design and configuration changes to mitigate flaws; (5) improving the speed of diagnosis of system flaws by comparing snapshots of resiliency testing against different versions of a system architecture; and so on.

Figure 2:
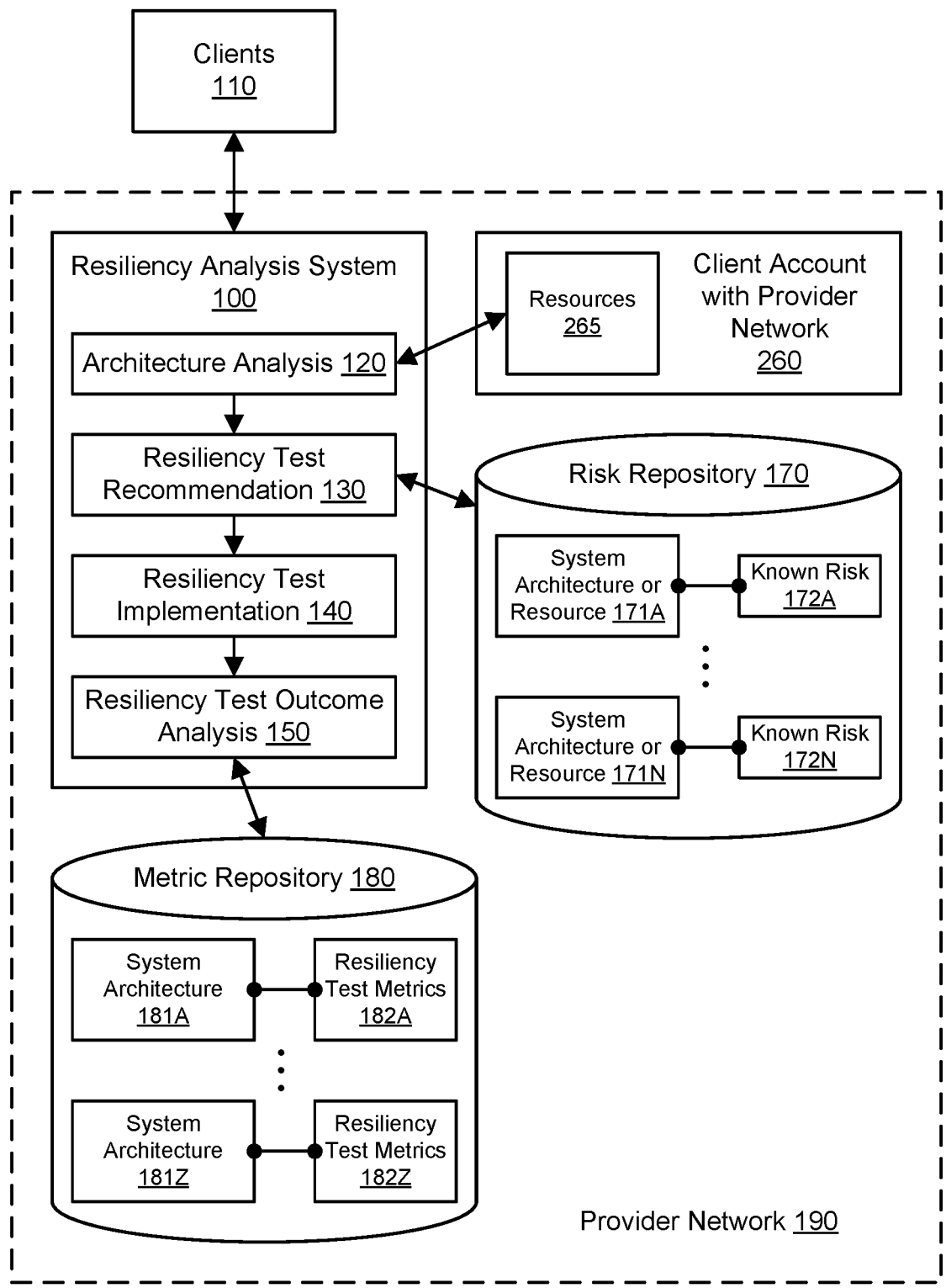
FIG. 2 illustrates further aspects of the example system environment for automated resiliency analysis in distributed systems, including a client account that lists a set of resources associated with the account, according to some embodiments.

FIG. 1 and FIG. 2 illustrate example system environments for automated resiliency analysis in distributed systems, according to some embodiments. A resiliency analysis system 100, also referred to as a resiliency analyzer, may perform a variety of tasks to assist developers in building systems that are resilient to failure. The resiliency of a system with respect to particular behaviors (e.g., behaviors associated with known failure scenarios) may relate to the ability of the system to withstand and/or recover from effects of the behaviors (e.g., effects on performance and/or availability). Resilient systems may be less likely to experience outages and performance degradation than non-resilient systems when particular behaviors are encountered in the systems. A resilient system may be expected to experience some smaller failures but not larger, system-wide outages. In one embodiment, the system 100 may perform automated analysis of system architectures. The automated analysis of system architectures may identify computing resources in a system, configurations of those resources, relationships between resources (e.g., as expressed in a dependency graph), and so on. In one embodiment, the system 100 may generate automated recommendations for resiliency testing of system architectures. The recommendations may be generated based (at least in part) on known risks associated with the resources in the system architecture and/or similar system architectures.

In one embodiment, the system 100 may perform or allow clients 110 to perform fault injection using resiliency tests that accurately model complex, real-world failure scenarios. For example, a resiliency test may model a failure scenario or degraded performance scenario resulting from the interaction between two or more resources and not simply a performance degradation at a single resource. Resiliency tests may model behaviors associated with known risks using multiple concurrent state changes and not simply one stage change at a time. Resiliency tests may model a request load to a service or system from clients of that service or system. Resiliency tests may be performed in a test environment before a system reaches production. In one embodiment, the system 100 may analyze the results of resiliency tests (e.g., as captured in metrics) to determine one or more effects of tested behaviors on the resiliency of a system. For example, the effects may include whether or not the performance or availability of a system architecture is vulnerable to unwanted behaviors associated with known failure scenarios. As another example, the effects may include whether or not a system architecture can recover from behaviors associated with known failure scenarios. In one embodiment, the system 100 may generate automated recommendations for design changes and/or configuration changes to improve the resiliency of the system architecture against known risks associated with resiliency tests.

In one embodiment, the functionality of the system 100 may be implemented in a provider network 190. The provider network 190 may represent a network operated by an entity such as a company or a public-sector organization to provide one or more services and other computing resources (such as various types of cloud-based computing or storage) accessible via the Internet and/or other networks to a distributed set of clients. The provider network 190 may include numerous data centers hosting various resource pools of computing resources, such as collections of physical and/or virtualized computer servers, storage devices, networking equipment and the like, that are used to implement and distribute the infrastructure and services offered by the provider. The provider network 190 may offer some resource pools and services to multiple clients concurrently and may thus be termed "multi-tenant." The computing resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). The provider network 190 may offer a set of services which can be invoked by clients, such as "serverless" computing solutions that allocate and manage servers and hosts on behalf of clients 110. For example, a serverless compute service may execute client-provided functions on behalf of clients 110 using computing instances under the control of the service itself and not the client. As another example, an application programming interface (API) management service may permit developers to create, publish, maintain, monitor, and secure APIs. A number of different types of computing devices may be used singly or in combination to implement the resources of the provider network 190 in different embodiments, including general purpose or special purpose computer servers, storage devices, network devices, and so on. In one embodiment, the functionality of the system 100 may be provided to clients as a web-accessible service associated with the provider network 190.

A system architecture under analysis may be implemented (entirely or partially) using computing resources hosted by a multi-tenant provider network 190. For example, computing resources in a system architecture may include functions that are executed by the serverless compute service, data that is stored using a cloud-based storage service, APIs managed using the API management service, virtual compute instances hosted in the cloud, load balancers and routers also hosted in the cloud, and so on. The computing resources in the provider network 190 may be managed and provisioned using a cloud resource management service 160. A model of computing resources in the system architecture may be described using a resource specification document 165 associated with the cloud resource management service 160. The resource specification document 165 may indicate the identity and configuration of resources as well as relationships between resources, such as service dependencies. The resource specification document 165 may be associated with a particular client account with the multi-tenant provider network 190 and may be used by services in the provider network to provision computing resources. In one embodiment, a system architecture under analysis may be associated with one such client account. In one embodiment, a system architecture under analysis may be associated with a plurality of client accounts with the multi-tenant provider network 190.

In one embodiment, the system 100 may perform automated system architecture analysis 120 to determine the computing resources in a system, the configurations of those resources, the relationships between resources (e.g., as expressed in a dependency graph), and so on. In one embodiment, as shown in FIG. 1, the automated system architecture analysis 120 may use, as input, a resource specification document 165 associated with a cloud resource management service 160 of the multi-tenant provider network 190. The resource specification document 165 may indicate the identity and configuration of resources as well as relationships between resources, such as service dependencies. In one embodiment, as shown in FIG. 2, the automated system architecture analysis 120 may use, as input, information in a particular client account 260 with the multi-tenant provider network 190. The client account 260 may specify a set of resources 265 and their configurations, and the automated system architecture analysis 120 may walk through the account 260 to determine the identity and configuration of resources in a system architecture as well as relationships between resources, such as service dependencies.

In one embodiment, the system 100 may generate automated recommendations for resiliency testing of system architectures. Using a component for automated resiliency testing recommendation 130, the recommendations may be generated based (at least in part) on known failure scenarios or risks associated with the resources in the system architecture and/or similar system architectures. The system 100 may include a repository 170 that stores data indicative of known failure scenarios or risks. The repository 170 may indicate that particular types of computing resources are vulnerable to particular failures or risks, including outages and/or performance degradation, when particular behaviors are encountered. For example, the repository 170 may indicate that a data streaming service has common failures associated with a timeout value for data that can be lost if the value is exceeded. The repository 170 may indicate that particular types of system architectures (or portions of system architectures) are vulnerable to particular failures when particular behaviors are encountered. For example, a typical web server architecture may have a typical set of resources arranged in a particular way, and the typical web server architecture may be vulnerable to one or more known failure scenarios or risks. As shown in the examples of FIG. 1 and FIG. 2, the repository 170 may store data 171A describing a particular system architecture or resource along with data describing a known risk 172A associated with that architecture or resource, and the repository may also store data 171N describing another system architecture or resource along with data describing a known risk 172N associated with that architecture or resource.

In one embodiment, the set of known failure scenarios 172A-172N may be curated by one or more administrators or other experts. In one embodiment, known failure scenarios or risks 172A-172N may be determined using automated resiliency testing for a variety of system architectures using the system 100. Using the automated system architecture analysis 120 and/or automated resiliency test recommendation 130, the system 100 may determine one or more similar system architectures with respect to the system architecture under analysis. Similar architectures may be determined based (at least in part) on similar sets of resources and/or similar relationships (e.g., as captured in dependency graphs) between resources. The similarity of a computing resource between two architectures may be determined using a name or identifier of the resource type and/or a configuration of the resource. The similarity of a system architecture may be determined using all or part of the set of resources in the architecture. In one embodiment, the similarity of system architectures may be determined relative to a predetermined threshold, e.g., such that two architectures are deemed similar if 75% of their components are similar. The system 100 may generate one or more recommended resiliency tests that cause the tested architecture to perform particular behaviors in an attempt to determine the resiliency of the tested architecture against any known failure scenarios or risks associated with individual resources in the system. The system 100 may generate one or more recommended resiliency tests that cause the tested architecture to perform particular behaviors in an attempt to determine the resiliency of the tested architecture against any known failure scenarios or risks associated with similar system architectures.

In one embodiment, the system 100 may perform or allow clients 110 to perform fault injection using resiliency tests that accurately model behaviors of complex, real-world failure scenarios. The system 100 may include a component for resiliency test implementation 140 that performs or allows clients 100 to perform the recommended tests. In one embodiment, the system 100 may present a set of recommended resiliency tests to a developer (e.g., in a user interface associated with the system) and solicit input from the developer to approve of the test(s). If the developer approves, then the system 100 may perform the test(s) in an appropriate execution environment. The test(s) may be run on a schedule or run without delay. To isolate resiliency testing from real-world clients of the system under analysis, resiliency tests may be performed in a test environment identified by a developer before a system reaches production. In one embodiment, the system 100 may provide a "stop" button in a user interface associated with the system 100 so that a developer can interrupt and discontinue the testing. In one embodiment, the system 100 may automatically stop a resiliency test when one or more thresholds are exceeded or other conditions are encountered during the test, e.g., as captured in resiliency test metrics. The thresholds and/or conditions that trigger an automatic discontinuation of a test may be specified by a client. A resiliency test may represent an experiment, and the client-specified thresholds and/or conditions may represent a hypothesis for how the system being tested will respond to fault injection. In one embodiment, the system 100 may provide a set of recommended resiliency tests to a developer such that the developer can implement the test(s) using resources under the developer's control.

A resiliency test may model a failure scenario including an interaction between a resource under the control of the client and a resource not under the control of the client, e.g., such that the failure originates in the resource not under the control of the client. A resiliency test may model a failure scenario resulting from the interaction between two or more resources and not simply a performance degradation at a single resource. For example, a resiliency test may model one or more behaviors of a failure scenario in which a downstream component (e.g., a data store) experiences degraded performance (e.g., a brownout due to heavy traffic or other performance degradation due to throttling), an upstream component that relies on the downstream component may similarly have its performance degraded as its requests are delayed or discarded, the upstream component may also increase its retry rate due to the delayed or discarded requests, and the additional request volume may further degrade the performance of the downstream component, leading in turn to further degraded performance at the upstream component. The resiliency analyzer may model behaviors of such failure scenarios by injecting multiple concurrent state changes that affect availability, latency, error rates, and so on, potentially in multiple components of a system architecture under analysis. Resiliency tests may model dynamic behaviors using multiple state changes to a given parameter over a period of time, e.g., as the impact of a performance degradation changes or as a given behavior changes. In one embodiment, resiliency tests may model a request load to a service or system from clients. The request load may be modeled based (at least in part) on recording and replaying a real-world request load. In one embodiment, resiliency tests may be generated based (at least in part) on observed metrics for types of resources within the multi-tenant provider network 190, e.g., such that the metrics indicate the behavior or resources or systems during outages. The observed metrics may be collected based (at least in part) on monitoring of services and other resources in the provider network 190.

In one embodiment, the system 100 may analyze the results of resiliency tests (e.g., as captured in metrics) to determine one or more effects of tested behaviors on the resiliency of a system architecture. For example, the determined effect(s) may include whether or not the a system architecture is vulnerable to unwanted behaviors associated with known failure scenarios, e.g., whether the system is resilient to the known failure scenarios (including degraded performance and/or outages) when the corresponding behaviors are encountered. As another example, the determined effect(s) may include whether or not a system architecture can recover from behaviors associated with known failure scenarios. Using a component for resiliency test outcome analysis 150, the system 100 may determine and report to clients 110 whether or not their system architectures were found to be resilient with respect to known risks and/or the corresponding resiliency tests. Using the outcome analysis 150, the system 100 may collect resiliency metrics associated with resiliency tests and store the metrics using a metric repository 180. As shown in the examples of FIG. 1 and FIG. 2, the metric repository 180 may store one set of resiliency test metrics 182A associated with one system architecture 181A and another set of resiliency test metrics 182Z associated with another system architecture 181Z. For example, the error rate, availability, latency, throughput, processor utilization, memory utilization, network utilization, and/or other metrics associated with services or resources under analysis may be collected for a given resiliency test. Resiliency metrics may capture the impact of resiliency tests on clients of the system architecture.

In one embodiment, the resiliency metrics 182A-182Z may be collected before, during, and after a resiliency test to determine the effects of behaviors. The "before" metrics may be collected to determine a steady state for the system before fault injection is performed. If, for example, the availability of a service is sufficiently reduced by a resiliency test as measured by the "before" and "during" metrics, then the system 100 may conclude that the system architecture is indeed vulnerable to the failure scenario corresponding to the test. Resiliency metrics may capture the recoverability of the system architecture. For example, if the availability of a service is sufficiently and persistently reduced by a resiliency test as measured by both the "during" and "after" metrics, then the system 100 may conclude that the system architecture will not be able to recover from the failure scenario corresponding to the test. In one embodiment, the metrics may be collected and maintained for the resiliency tests for different versions of a system architecture over time. If a system architecture was not susceptible to a particular failure scenario in an older version but is susceptible in a newer version, then changes to the architecture may be identified as a cause of failure by comparing newer metrics to older metrics.

In one embodiment, using the outcome analysis 150, the system 100 may generate automated recommendations for design changes and/or configuration changes to improve the resiliency of the system architecture against known risks of failure associated with resiliency tests. The recommended changes may be determined based (at least in part) on a comparison between design choices and/or configurations in the system under analysis and design choices and/or configurations in other system architectures with better resiliency. In one embodiment, the system 100 may present a set of recommended changes tests to a developer, e.g., in a user interface associated with the system 100 or in a report. By implementing the recommended changes, the developer may improve the resiliency of a system to mitigate the impact of failures.

It is contemplated that the system 100 may include additional components not shown, fewer components than shown, or different combinations, configurations, or quantities of the components shown. The system 100 may comprise one or more computing devices, any of which may be implemented by the example computing device 3000 illustrated in FIG. 7. In various embodiments, portions of the system 100 may be provided by the same computing device or by any suitable number of different computing devices. If any of the components of the system 100 are implemented using different computing devices, then the components and their respective computing devices may be communicatively coupled, e.g., via a network. Each of the illustrated components may represent any combination of software and hardware usable to perform their respective functions. It is contemplated that the system 100 may be invoked to perform resiliency testing based (at least in part) on initial user input, e.g., through a user interface or API. However, beyond the invocation of the system 100, aspects of the functionality of the system may be performed in an automated manner without soliciting input from a user associated with the system architecture under analysis.

Figure 7:
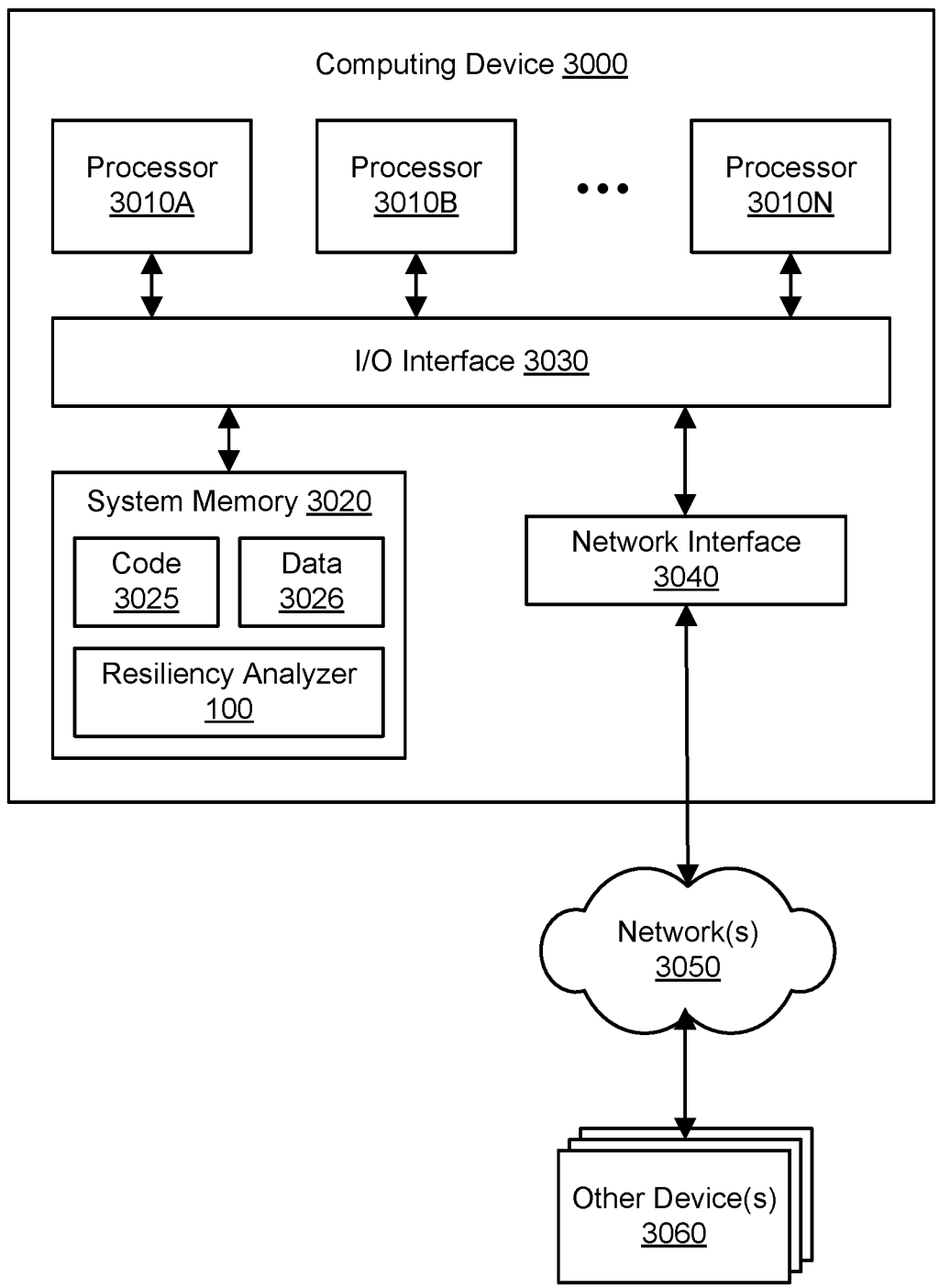
FIG. 7 illustrates an example computing device that may be used in some embodiments.

The clients 110 may represent different processes, systems, and/or computing device (e.g., as implemented using the example computing device 3000 illustrated in FIG. 7). Client devices 110 may be operated by developers that seek to use the system 100 to perform automated resiliency analysis. In various embodiments, clients 110 may be internal or external to the provider network 190. Client devices 110 may be distributed on multiple computing devices throughout one or more networks, including private networks and/or public networks such as the Internet. The client devices 110 may also be coupled to the system 100 through one or more networks, including private networks and/or public networks such as the Internet. The client devices 110 may interact with the system 100 using one or more suitable interfaces, such as one or more application programming interfaces (APIs), e.g., to invoke the functionality of the system 100 for automated resiliency analysis.

Figure 3A:
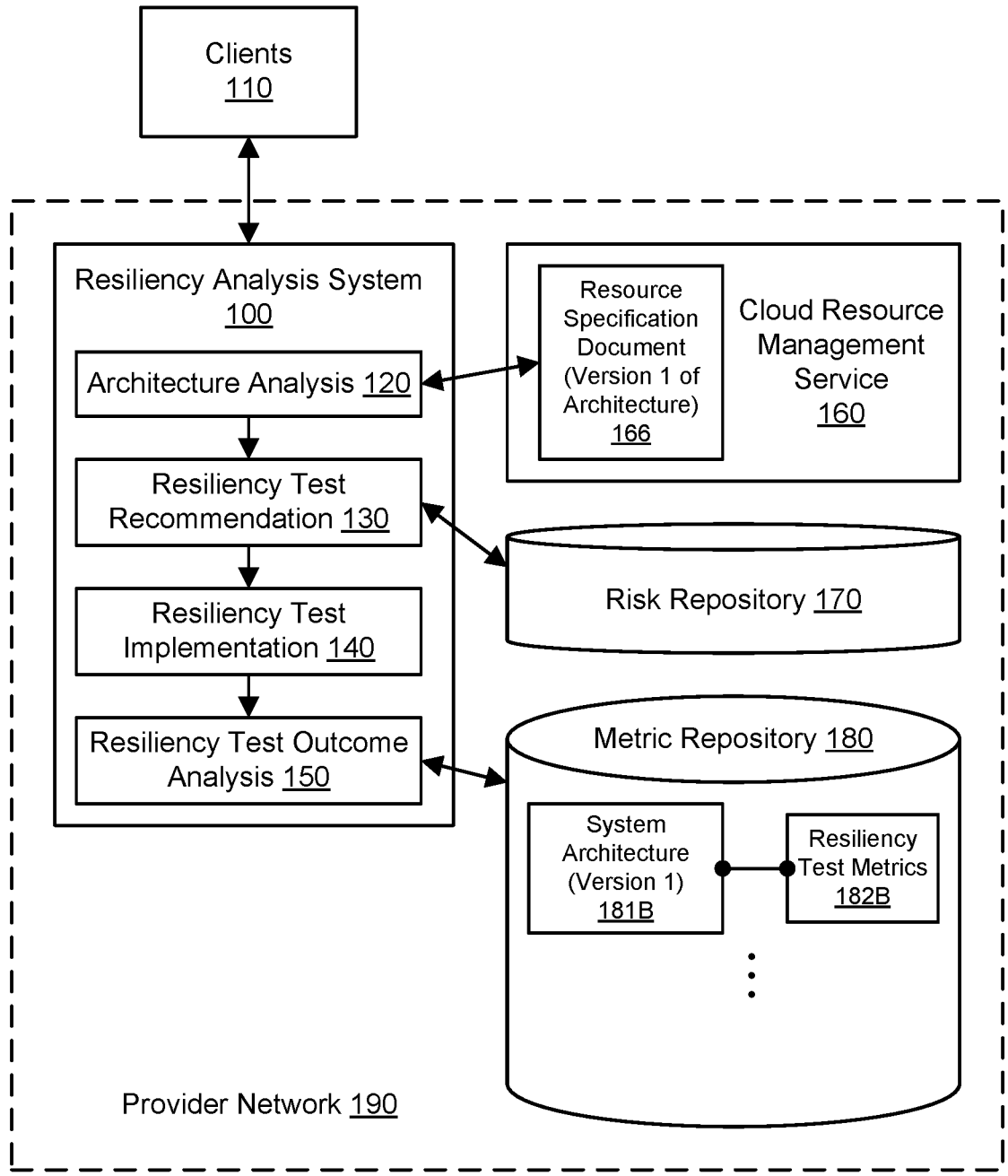
FIG. 3A and FIG. 3B illustrate further aspects of the example system environment for automated resiliency analysis in distributed systems, including the testing of different versions of a system architecture and a comparison of the results for resiliency analysis, according to some embodiments.
Figure 3B:
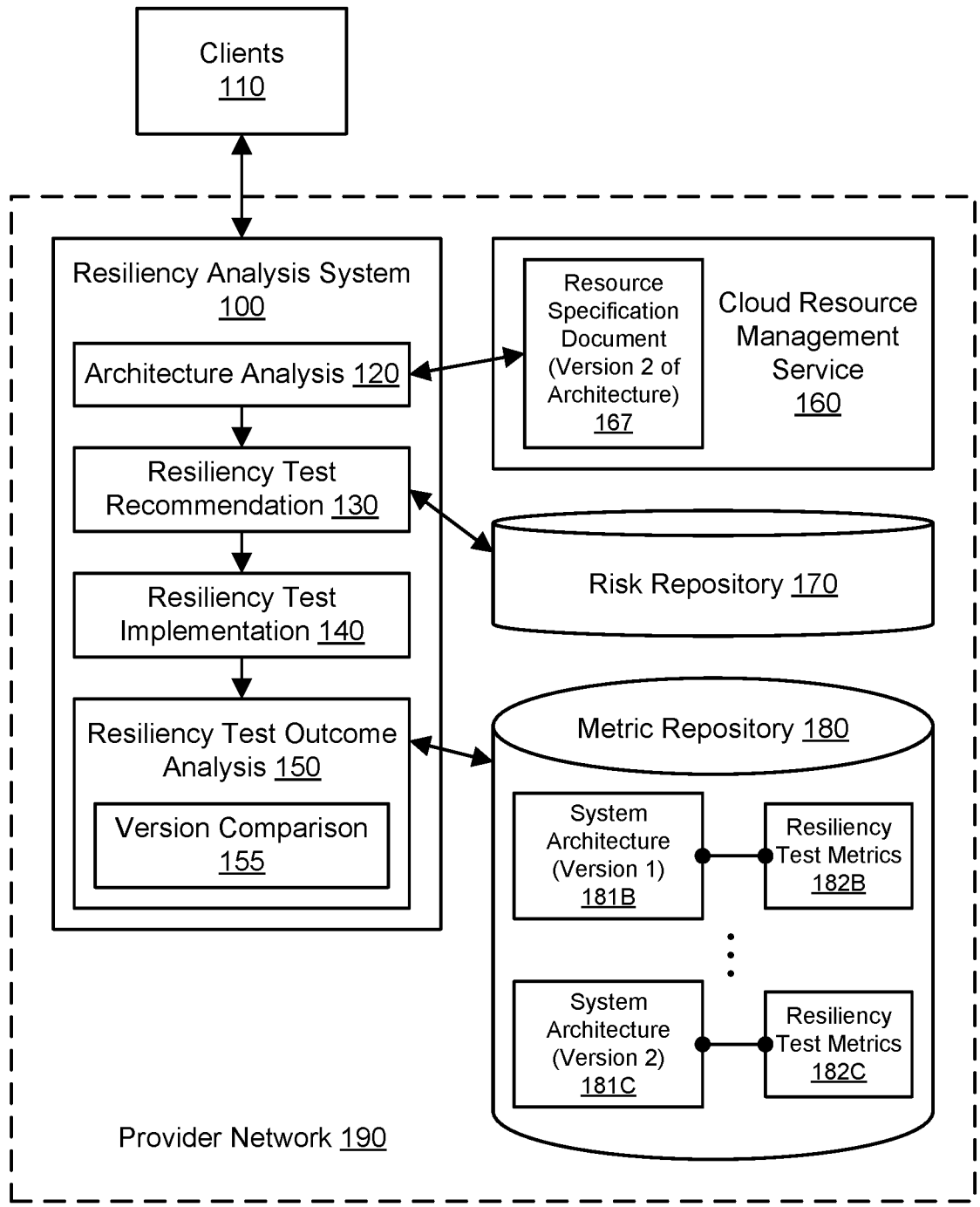

FIG. 3A and FIG. 3B illustrate further aspects of the example system environment for automated resiliency analysis in distributed systems, including the testing of different versions of a system architecture and a comparison of the results for resiliency analysis, according to some embodiments. As shown in the example of FIG. 3A, the system 100 may perform automated architecture analysis 120 and resiliency testing 140 for a particular version (e.g., version 1) of a particular system architecture. The architecture analysis 120 may be performed using a resource specification document 166 maintained by the cloud resource management service. The resource specification document 166 may indicate the identity and configuration of resources as well as relationships between resources, such as service dependencies, in version 1 of the system architecture. As discussed above, the system 100 may analyze the results of resiliency tests (e.g., as captured in metrics) to determine whether or not the version of the system architecture is vulnerable to behaviors associated with known failure scenarios or risks. As a result of the resiliency testing 140 for version 1 of the system architecture, the system 100 may store resiliency test metrics 182B associated with version 1 of the system architecture 181B.

In one embodiment, the metrics may be collected and maintained for the resiliency tests for different versions of a system architecture over time. As shown in the example of FIG. 3B, the system 100 may perform automated architecture analysis 120 and resiliency testing 140 for a later version (e.g., version 2) of the same system architecture. The architecture analysis 120 may be performed using a resource specification document 167 maintained by the cloud resource management service. The resource specification document 167 may indicate the identity and configuration of resources as well as relationships between resources, such as service dependencies, in version 2 of the system architecture. As discussed above, the system 100 may analyze the results of resiliency tests (e.g., as captured in metrics) to determine whether or not the version of the system architecture is vulnerable to behaviors associated with known failure scenarios or risks. As a result of the resiliency testing 140 for version 2 of the system architecture, the system 100 may store resiliency test metrics 182C associated with version 2 of the system architecture 181C.

The system 100 may track the resiliency of a system architecture over time, e.g., as the architecture changes or as the environment (e.g., customer request load) changes. In one embodiment, the outcome analysis 150 may perform a version comparison 155 between the resiliency testing for version 1 and version 2 of the system architecture. The version comparison 155 may use the metrics 182B and 182C. If, based on resiliency testing, version 1 of the system architecture was not susceptible to a particular behavior or risk but version 2 is susceptible to that behavior or risk, then the system 100 may report the difference. In one embodiment, the version comparison 155 may determine any differences between version 1 of the architecture 181B and version 2 of the architecture, and the system 100 may notify the developer that the differences may be responsible for the failure. Similarly, if version 1 was susceptible to a particular failure but version 2 (later in time) was not, then the system 100 may report the improvement and flag the changes in the architecture between version 1 and version 2. The system 100 may also report changes in resiliency test metrics between the different versions.

Figure 4:
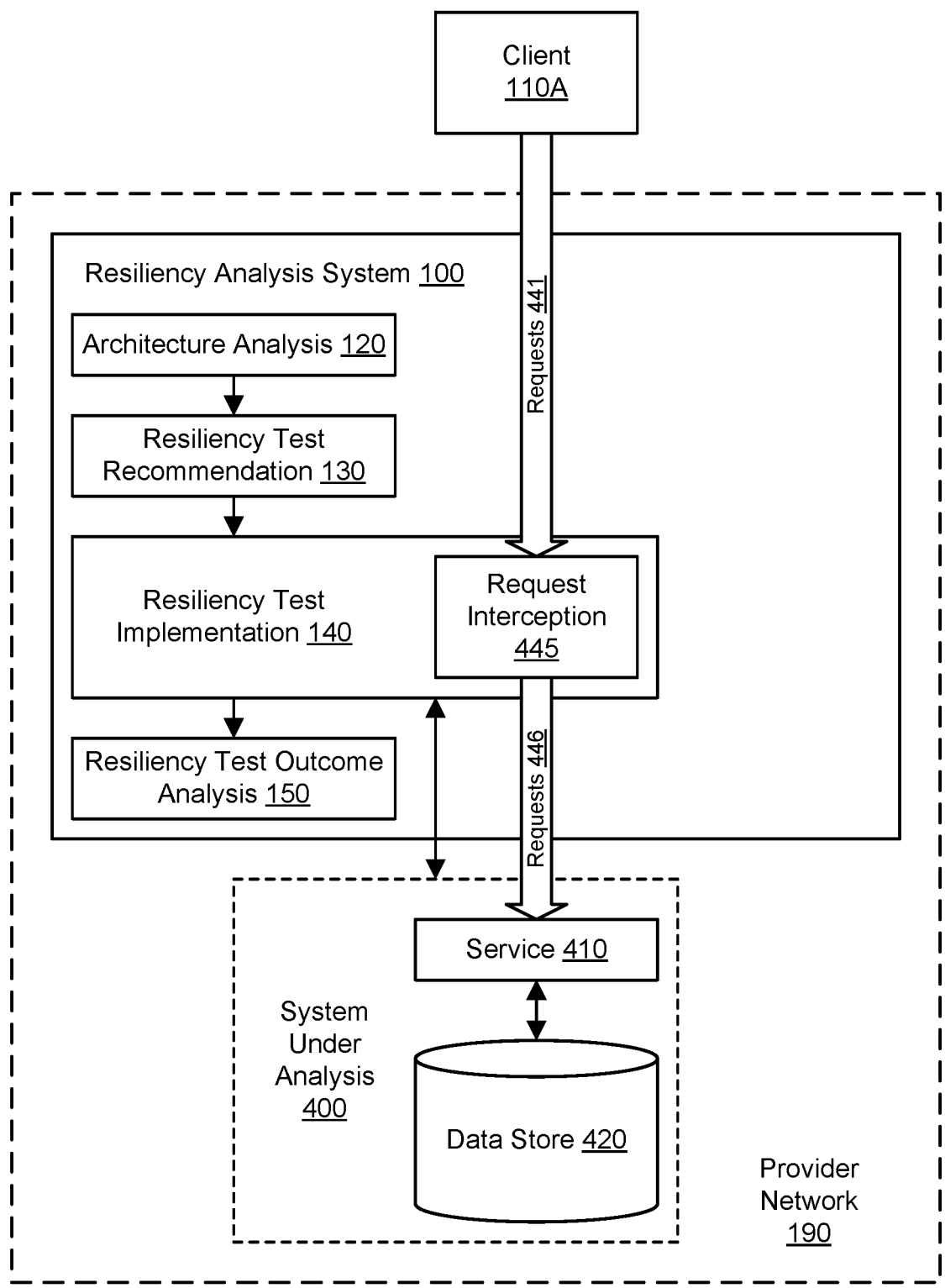
FIG. 4 and FIG. 5 illustrate further aspects of the example system environment for automated resiliency analysis in distributed systems, including examples of request interception in performing resiliency tests, according to some embodiments.
Figure 5:
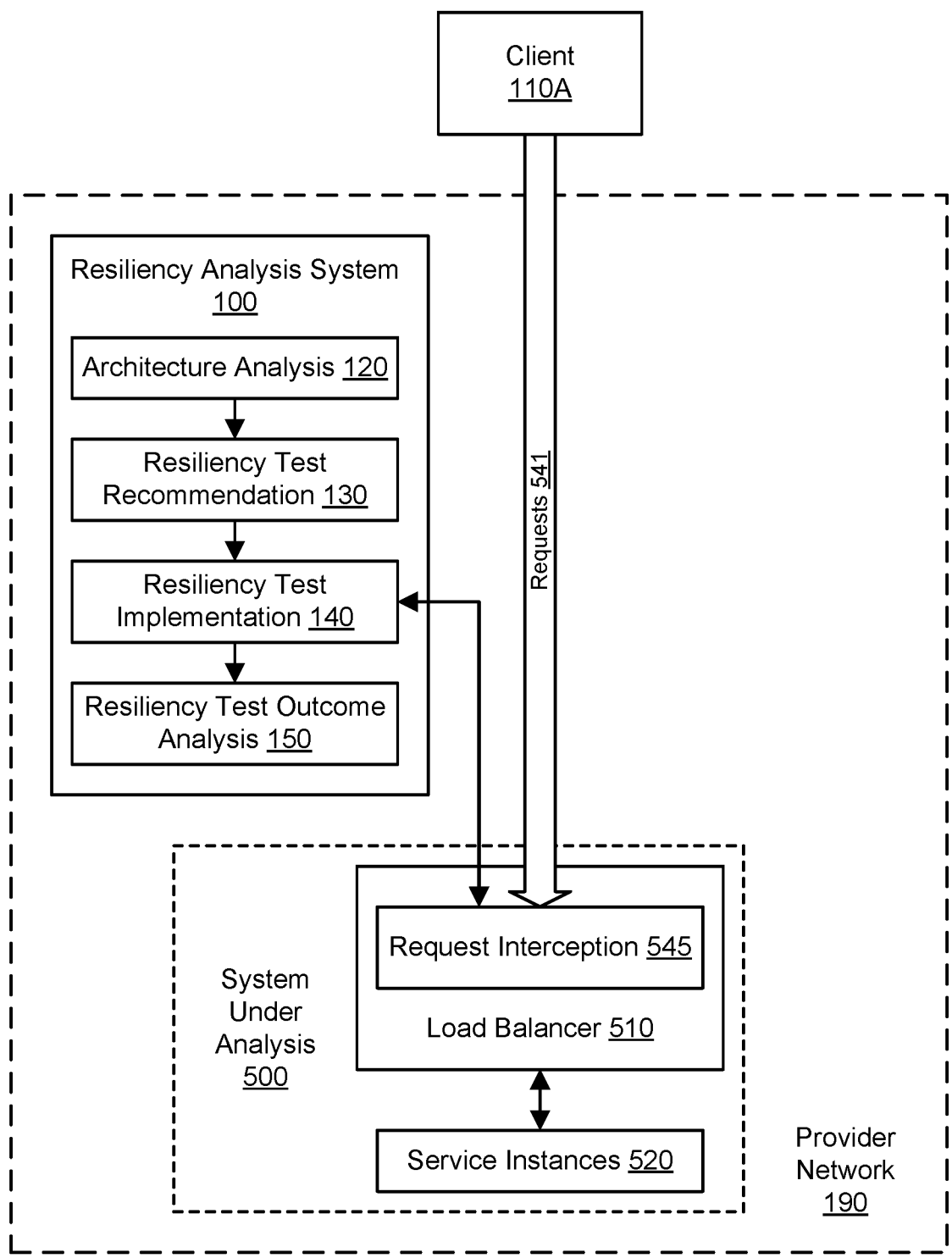

FIG. 4 and FIG. 5 illustrate further aspects of the example system environment for automated resiliency analysis in distributed systems, including examples of request interception in performing resiliency tests, according to some embodiments. In various embodiments, the system 100 may interact with systems under analysis for fault injection and other forms of resiliency testing. As shown in the example of FIG. 4, the component for resiliency test implementation 140 may include a component for request interception 445. When a test is run, a customer request load 441 may be generated for a system under analysis 400. The requests 441 may be generated by a client device or system 110A (as shown in FIG. 4), by the system 100 itself, or by an external component. The requests may simulate a real-world usage that was previously observed in the system under analysis 400. To perform fault injection, the request interception component 445 may hold requests to simulate poor latency, drop requests, re-route requests, modify the contents of requests, and/or other suitable behaviors to simulate failure scenarios. Requests 446 that are not dropped may be passed on to the system under analysis 410 for processing by the system under analysis. FIG. 4 shows an example of a system under analysis 400 having at least two computing resources: a service 410 that receives the requests 446 and is dependent on a data store 420. As discussed above, the service 410 and data store 420 may be implemented in the provider network 190. The system under analysis 400 may represent a test environment and not a production environment to isolate real-world customers from the effects of resiliency testing.

Resiliency tests may represent dynamic state changes to a given parameter over a period of time, e.g., as the impact of a performance degradation changes. The operations performed by the request interception component 445 may change over the course of the resiliency test. For example, 100% of the requests 441 may be passed on to the service 410 during an initial period of time. To simulate a worsening outage, 1% of the requests 441 may be dropped during the next ten seconds, and then 2% of the requests 441 may be dropped during an additional ten seconds. The system 100 may collect metrics for each stage of the resiliency test to measure the impact of different failure characteristics for requests 441.

Also using the system under analysis 400, the resiliency testing 140 may model a failure scenario in which a downstream data store 420 experiences degraded performance (e.g., a brownout due to heavy traffic or other performance degradation due to throttling). In this model, an upstream component such as the service 410 may similarly have its performance degraded as its requests are delayed or discarded by another instance of the request interception component 445. As time goes on, the upstream service 410 may increase its retry rate due to the delayed or discarded requests, and the additional request volume may further degrade the performance of the downstream data store 420, leading in turn to further degraded performance at the upstream service. The resiliency analyzer 100 may model such failure scenarios by injecting multiple concurrent state changes that affect availability, latency, error rates, and so on, potentially in multiple components of a system architecture under analysis.

As shown in the example of FIG. 5, the request interception may be integrated in one or more of the computing resources in a system 500 under analysis. In one embodiment, a component for request interception 545 may be implemented as part of a load balancer 510 for a set of service instances 520. In some embodiments, the request interception 545 may be implemented in front of or behind the load balancer 510. When a test is run, a customer request load 541 may be generated for the system under analysis 500. The requests 541 may be generated by a client device or system 110A (as shown in FIG. 5), by the system 100 itself, or by an external component. The requests may simulate a real-world usage that was previously observed in the system under analysis 500. To perform fault injection, the request interception component 545 may hold requests to simulate poor latency, drop requests, re-route requests, modify the contents of requests, and/or other suitable behaviors to simulate failure scenarios. In one embodiment, the load balancer 510 may simulate an unavailability behavior of some of the service instances 520 by holding or delaying requests to those instances. As discussed above, the load balancer 510 and service instances 520 may be implemented in the provider network 190. The system under analysis 500 may represent a test environment and not a production environment to isolate real-world customers from the effects of resiliency testing. In a similar manner, other services of the provider network 190 may be instrumented or otherwise modified to assist in implementing resiliency tests. For example, a serverless compute service may route traffic to particular containers with customer-supplied functions as part of resiliency testing.

Figure 6:
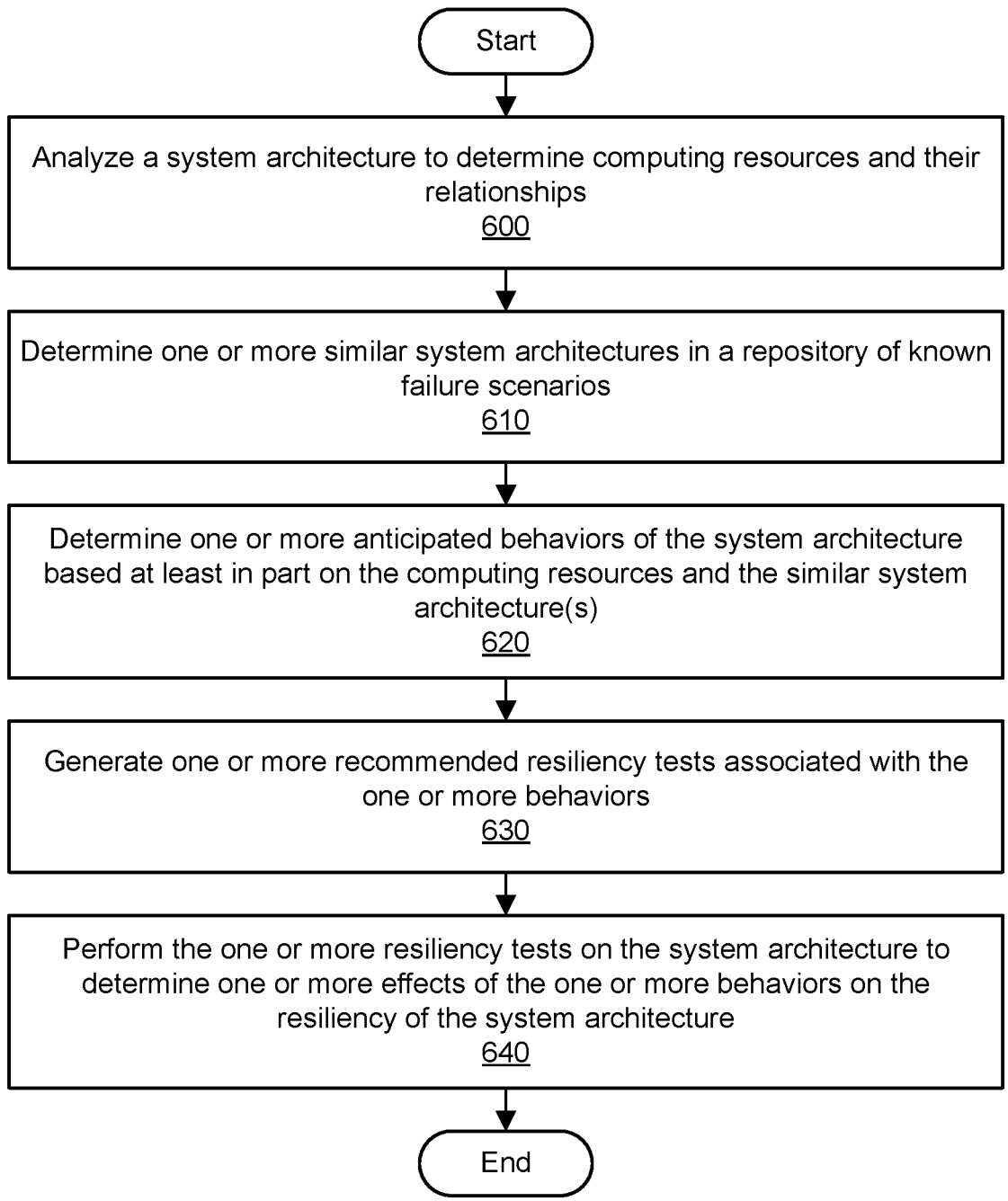
FIG. 6 is a flowchart illustrating a method for automated resiliency analysis in distributed systems, according to some embodiments.

FIG. 6 is a flowchart illustrating a method for automated resiliency analysis in distributed systems, according to some embodiments. As shown in 600, a system architecture may be analyzed to determine computing resources, their configurations, and/or their relationships. In one embodiment, a resource specification document may be used as input for the automated analysis of system architecture. The document may be maintained by or otherwise associated with a cloud resource management service of a multi-tenant provider network. The resource specification document may indicate the identity and configuration of resources as well as relationships between resources, such as service dependencies. In one embodiment, particular client account with the multi-tenant provider network may be used as input for the automated analysis of system architecture. The client account may specify a set of resources and their configurations, and the automated system architecture analysis may walk through the account to determine the identity and configuration of resources in a system architecture as well as relationships between resources, such as service dependencies.

As shown in 610, one or more similar system architectures may be determined for the system architecture under analysis. The similarity of system architectures may be determined by comparing components and their relationships, e.g., using dependency graphs. A repository may indicate that particular types of system architectures (or portions of system architectures) are vulnerable to particular failures. For example, a typical web server architecture may have a typical set of resources arranged in a particular way, and the typical web server architecture may be vulnerable to one or more known failure scenarios or risks. The repository may also indicate that particular types of computing resources are vulnerable to particular failures or risks associated with particular behaviors. For example, the repository may indicate that a data streaming service has common failures associated with a timeout value for data that can be lost if the value is exceeded.

As shown in 620, one or more anticipated behaviors may be determined for the system architecture under analysis. The behaviors may be associated with known risks or failure scenarios. The one or more behaviors may be determined based (at least in part) on the computing resources in the architecture and/or the similar system architectures. As shown in 630, one or more recommended resiliency tests may be generated. Each of the tests may be associated with one or more of the anticipated behaviors. The resiliency test(s) may accurately model behaviors in complex, real-world failure scenarios such as failures resulting from the interaction between two or more resources and not simply a performance degradation at a single resource. For example, a resiliency test may model a failure scenario in which a downstream component (e.g., a data store) experiences degraded performance (e.g., a brownout due to heavy traffic or other performance degradation due to throttling), an upstream component that relies on the downstream component may similarly have its performance degraded as its requests are delayed or discarded, the upstream component may also increase its retry rate due to the delayed or discarded requests, and the additional request volume may further degrade the performance of the downstream component, leading in turn to further degraded performance at the upstream component. The resiliency analyzer may model such failure scenarios by injecting multiple concurrent state changes that affect availability, latency, error rates, and so on, potentially in multiple components of a system architecture under analysis. In one embodiment, resiliency tests may model a request load to a service or system from clients.

As shown in 640, the one or more resiliency tests may be performed on the system architecture under analysis. In one embodiment, the recommended resiliency tests may be presented to a user (e.g., in a user interface) and performed if approval is received. To isolate resiliency testing from real-world clients of the system under analysis, resiliency tests may be performed in a test environment identified by a developer before a system reaches production. In one embodiment, the recommended resiliency test(s) may be provided to a developer such that the developer can implement the test(s) using resources under the developer's control. The testing may determine one or more effects of the one or more behaviors on the resiliency of the system architecture. For example, the testing may determine whether the system architecture is resilient to a particular set of behaviors associated with a failure scenario, e.g., by analyzing the performance of the system architecture when the behavior(s) are injected. As part of the testing, resiliency metrics associated with resiliency tests may be collected and stored using a metric repository. Resiliency metrics may capture the impact of tested behaviors, e.g., on clients of the system architecture. In one embodiment, the resiliency metrics may be collected before, during, and after a resiliency test to determine the impact of a failure scenario. Resiliency test metrics may be analyzed with respect to predetermined thresholds in determining whether a system architecture is sufficiently resilient. Using the metrics, a resiliency analyzer may determine whether a system is vulnerable to a known risk at a relatively early stage in development, e.g., before the system is put into production. In one embodiment, the resiliency analyzer may generate automated recommendations for design changes and/or configuration changes to improve the resiliency of the system architecture against known risks of failure associated with resiliency tests. By implementing the recommended changes, the developer may improve the resiliency of a system to mitigate the impact of failures.

Illustrative Computer System

In at least some embodiments, a computer system that implements a portion or all of one or more of the technologies described herein may include a computer system that includes or is configured to access one or more computer-readable media. FIG. 7 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 7 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a repository storing data descriptive of a plurality of system architectures and a plurality of performance risks associated with the system architectures; and
a resiliency analyzer comprising one or more processors and one or more memories to store computer-executable instructions that, if executed, cause the one or more processors to:
determine a plurality of computing resources associated with a system architecture;
determine, with respect to the system architecture, one or more similar system architectures in the plurality of system architectures described in the repository;
determine one or more performance risks associated with the system architecture based at least in part on the plurality of computing resources and the one or more similar system architectures;
generate one or more resiliency tests associated with the one or more performance risks, wherein the one or more resiliency tests represent one or more models of the one or more performance risks, wherein at least one of the resiliency tests comprises a plurality of concurrent state changes to the system architecture, and wherein the one or more resiliency tests are performed on the system architecture; and
determine one or more effects of the one or more resiliency tests on a resiliency of the system architecture, wherein the one or more effects are determined using one or more metrics generated using the one or more resiliency tests.

2. The system as recited in claim 1, wherein the plurality of computing resources comprise one or more services hosted in a multi-tenant provider network.

3. The system as recited in claim 2, wherein one or more servers that implement the one or more services are allocated by the multi-tenant provider network and used on behalf of one or more clients.

4. The system as recited in claim 1, wherein at least one of the resiliency tests performs fault injection and models a series of requests from clients of one or more of the computing resources.

5. A method, comprising:
determining, by a resiliency analyzer, a plurality of computing resources associated with a system architecture;
determining, by the resiliency analyzer, one or more similar system architectures with respect to the system architecture, wherein respective identifiers of the one or more similar system architectures are stored in a repository;
determining, by the resiliency analyzer, one or more behaviors associated with the system architecture based at least in part on the plurality of computing resources and the one or more similar system architectures identified in the repository; and
generating, by the resiliency analyzer, one or more resiliency tests associated with the one or more behaviors, wherein the one or more resiliency tests are performed on the system architecture, and wherein one or more effects of the one or more behaviors on a resiliency of the system architecture are determined based at least in part on the one or more resiliency tests.

6. The method as recited in claim 5, wherein the plurality of computing resources and one or more relationships between the computing resources are determined based at least in part on a document describing the system architecture, wherein the document is maintained by a cloud resource management service.

7. The method as recited in claim 5, wherein the plurality of computing resources and one or more relationships between the computing resources are determined based at least in part on an analysis of an account associated with the computing resources, wherein the account permits access to a multi-tenant provider network.

8. The method as recited in claim 5, wherein the plurality of computing resources comprise one or more services hosted in a multi-tenant provider network.

9. The method as recited in claim 8, wherein one or more servers that implement the one or more services are allocated by the multi-tenant provider network and used on behalf of one or more clients.

10. The method as recited in claim 5, wherein the one or more resiliency tests represent one or more models of failure scenarios or degraded performance scenarios, wherein at least one of the resiliency tests comprises a plurality of concurrent state changes to the system architecture, and wherein the one or more effects of the one or more behaviors are determined using one or more metrics generated by the one or more resiliency tests.

11. The method as recited in claim 5, wherein at least one of the resiliency tests models a series of requests from clients of one or more of the computing resources.

12. The method as recited in claim 5, further comprising:
displaying, via a user interface, a description of the one or more resiliency tests; and
receiving, via the user interface, input approving the one or more resiliency tests, wherein the one or more resiliency tests are performed based at least in part on the input.

13. The method as recited in claim 5, wherein at least one of the resiliency tests is performed using individual ones of the computing resources associated with a plurality of accounts with a multi-tenant provider network.

14. The method as recited in claim 5, wherein at least one of the resiliency tests is performed a plurality of times using different versions of the system architecture, and wherein the resiliency analyzer stores resiliency test metrics associated with the different versions of the system architecture.

15. One or more non-transitory computer-readable storage media storing program instructions that, when executed on or across one or more processors, perform:
determining a plurality of computing resources associated with a system architecture;

determining, in a repository of system architectures, one or more similar system architectures with respect to the system architecture;

determining one or more anticipated behaviors associated with the system architecture based at least in part on the plurality of computing resources and the one or more similar system architectures determined within the repository; and generating one or more resiliency tests associated with the one or more anticipated behaviors, wherein the one or more resiliency tests perform fault injection for a plurality of faults in the system architecture, and wherein the one or more resiliency tests determine a resiliency of the system architecture to the one or more anticipated behaviors.

16. The one or more non-transitory computer-readable storage media as recited in claim 15, wherein the plurality of computing resources comprise one or more services hosted in a multi-tenant provider network.

17. The one or more non-transitory computer-readable storage media as recited in claim 16, wherein one or more of the services implement at least a portion of the one or more resiliency tests using request interception or modification for a plurality of requests from clients.

18. The one or more non-transitory computer-readable storage media as recited in claim 15, wherein the one or more resiliency tests represent one or more models of failure or degraded performance, and wherein at least one of the resiliency tests comprises a plurality of concurrent state changes to the system architecture.

19. The one or more non-transitory computer-readable storage media as recited in claim 15, wherein at least one of the resiliency tests models a request load from clients of one or more of the computing resources.

20. The one or more non-transitory computer-readable storage media as recited in claim 15, wherein at least one of the resiliency tests is performed a plurality of times using different versions of the system architecture, and wherein a resiliency analyzer stores resiliency test metrics associated with the different versions of the system architecture, and wherein one or more differences in resiliency of the different versions of the system architecture are determined using the resiliency test metrics.

* * * * *